Patented Aug. 17, 1926.

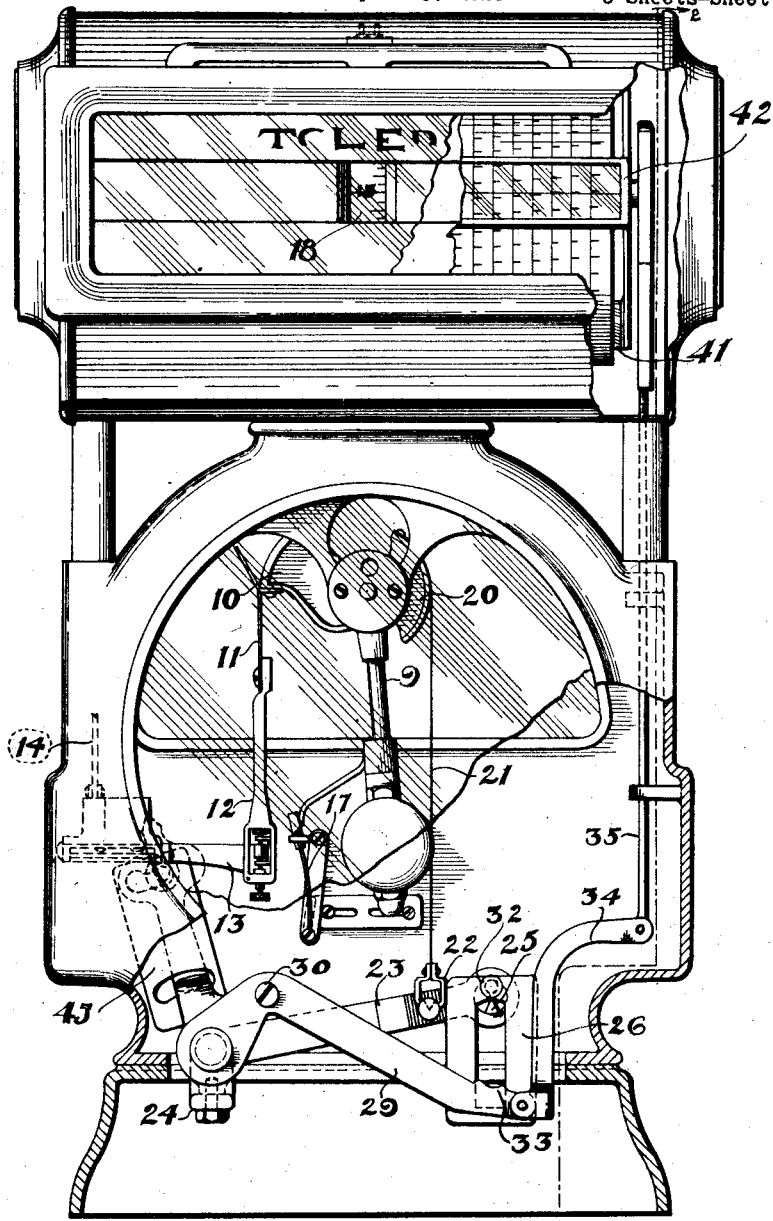

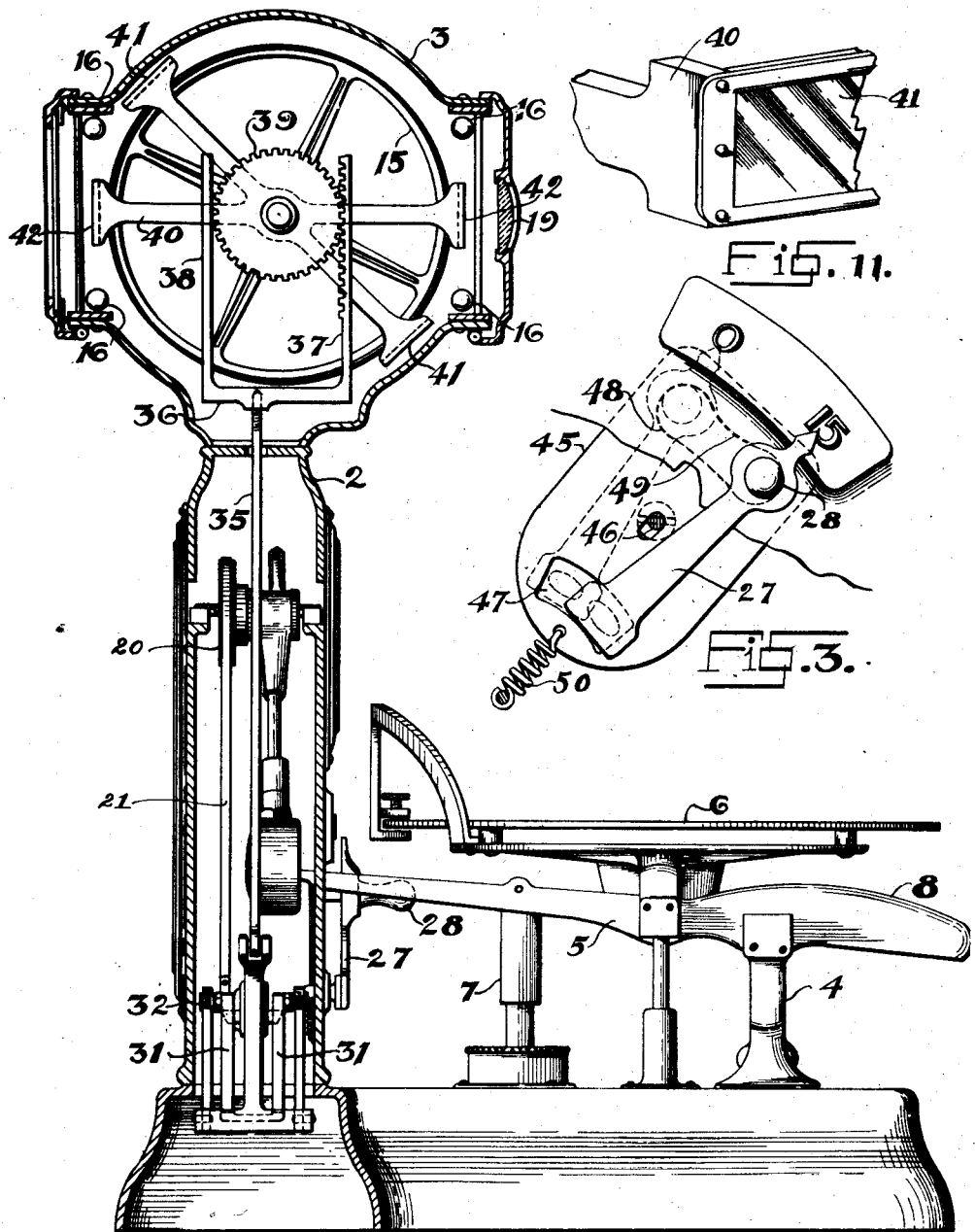

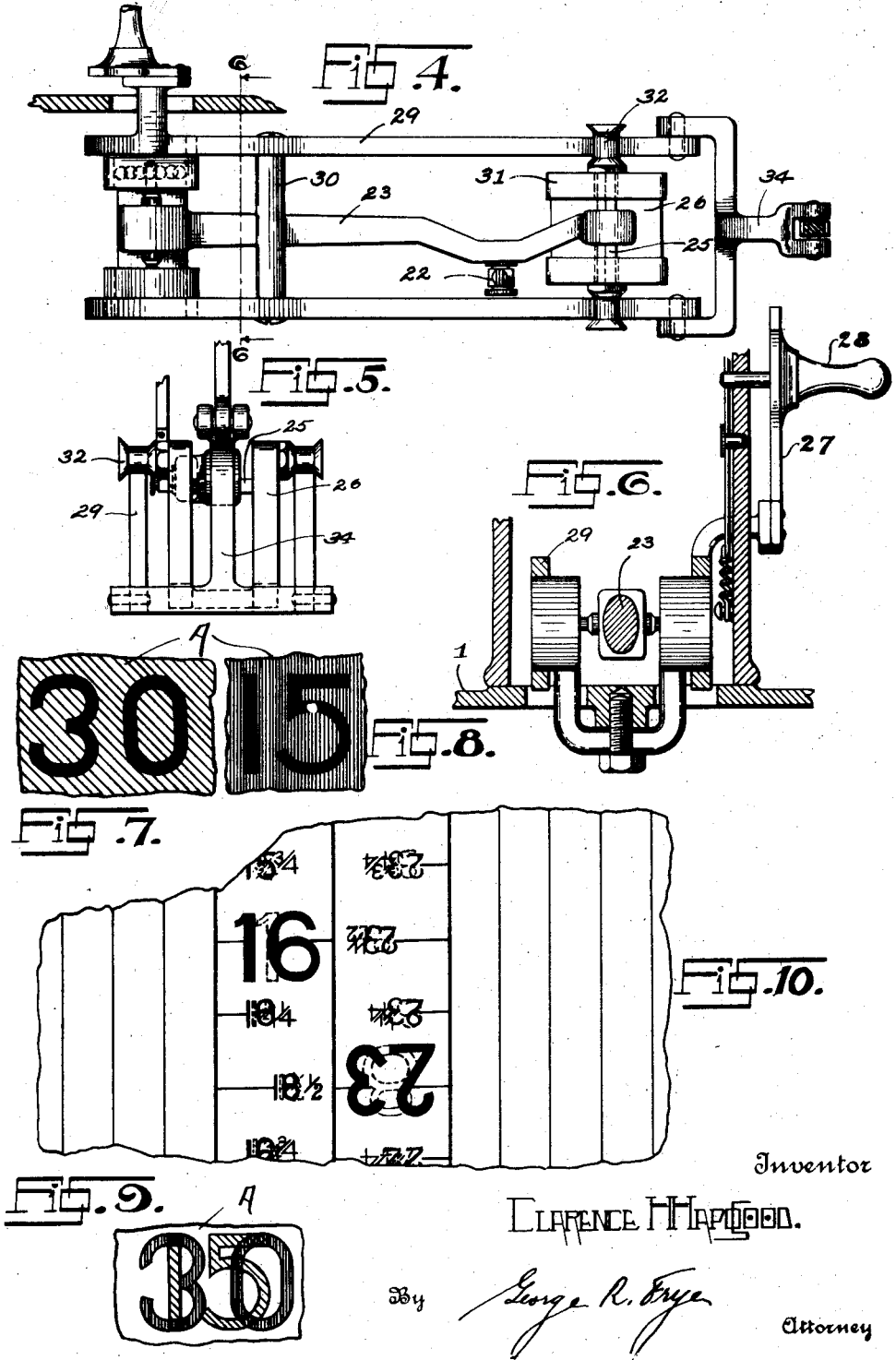

1,596,352

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 5, 1920. Serial No. 371,404.

This invention relates to weighing scales, particularly scales of the automatic type.

One of its principal objects is to provide means for increasing the number of computations that may be indicated by scales of this type without increasing the dimensions of the indicating mechanism or decreasing the size of the numerals or the spaces therebetween.

Another object is the provision of an indicating chart having a plurality of sets of optically dissimilar characters of different values, and means for selectively rendering one only of said sets legible.

Another object is the provision of means for increasing the indicating capacity of charts such as are used in automatic scales of the "cylinder" type.

Another object is the provision of means for increasing the weighing capacity of scales of the "cylinder" type.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear elevation of a scale embodying my invention, parts being broken away and parts being shown in section;

Figure 2 is a vertical sectional view taken substantially on the line 2—2 of Figure 1;

Figure 3 is a fragmentary detail view showing a shifting handle and pointer;

Figure 4 is a plan view of capacity-increasing levers forming part of my invention, the levers being removed from the scale;

Figure 5 is a side elevation of the mechanism shown in Figure 4;

Figure 6 is a sectional view taken substantially on the line 6—6 of Figure 4;

Figure 7 is a fragmentary representation of the appearance of a portion of the chart as viewed through a screen of one color;

Figure 8 is a similar representation of the appearance of the same portion of the chart as viewed through a screen of a different color;

Figure 9 is a representation of the appearance of the same portion of the chart as viewed without a screen;

Figure 10 is a diagram of a more extensive portion of the chart showing the positions of the characters and graduations; and Figure 11 is a fragmentary detail view of the mounting for the color screens.

It is to be understood that the scale shown in the drawings and described herein is merely an exemplary embodiment of my invention, which is also adapted for embodiment in scales having other types of indicating charts and other types of load-offsetting mechanism.

The frame of the scale as illustrated comprises a base 1 upon the rear end of which is supported an upright housing 2 of substantially watch-casing shape surmounted by an elongated casing 3. Supported upon the base 1 is a base horn 4 which forms a fulcrum stand for the main lever 5 of the scale. This lever supports a platter or commodity-receiver 6, and is connected, as at 7, to the plunger of a dash pot which serves to damp the vibration of the weighing mechanism. In order to counterbalance the weight of the lever 5 and the parts carried thereby, a counterweight 8 is formed from the lever and projects forwardly beyond the fulcrum. A load-offsetting pendulum 9 is pivotally supported inside the casing 2 and carries an eccentric power sector 10, which is connected by means of a flexible metallic band or ribbon 11 and a link 12 to the nose of the lever 5. The forward end of the lever 5 carries a rigid laterally-extending member 13 which is connected by means of a rack rod 14 to a pinion (not shown) fixed to the axial shaft of the cylindrical chart 15. Located within the casing 3 in position to illuminate the chart is a plurality of electric lamps 16 which are controlled by a resilient switch 17 normally held open by the pendulum.

When a load is placed upon the platter 6 the lever 5 is forced downwardly and a downward pull is thus exerted on the ribbon 11, which causes the pendulum 9 to swing upwardly until the load is offset. As the pendulum moves away from zero position the switch 17 closes and lights the lamps so that the chart is illuminated. As the lever moves downwardly it draws the rack rod 14 downwardly and thereby rotates the chart to display a weight indication through a window 18 in the rear side of the casing 3 and to display weight and value indications through a magnifying window 19 in the front side of the casing 3. In order that the weights and values on the chart may be accurately read, the chart is divided into columns and each column is suitably graduated by means of horizontal lines to be brought by rotation of the chart into approximate registration with hair line indicating wires stretched horizontally between the cylindrical chart 15 and the windows 18 and 19. The graduations are marked with appropriate numerals designating the weights and values indicated when the respective graduations are brought into registration with the reading wires.

The mechanism so far described is substantially like that shown and described in fuller detail in the co-pending application of Lewis C. Wetzel, Ser. No. 651,071, filed September 5, 1911. For the purpose of increasing the indicating range of the chart I print thereon two sets of characters in different colors and provide means to selectively bring the respective sets of characters into prominence. Such means may consist of either of two sets of lamps colored to correspond with the colors of the characters on the chart, or of colored screens so arranged that the chart may be viewed through them.

In this embodiment of my invention I provide a device to offset a weight upon the platter equal to the automatic capacity of the scale. The pendulum 9, as illustrated, carries a sector 20, the center of curvature of which lies in the pivotal axis of the pendulum, and overlying and connected to the sector 20 is a flexible metallic ribbon 21, the lower end of which is connected, as at 22, to a lever 23. The lever 23 is pivoted at one end to a bracket 24 in the lower end of the housing 2 and is provided at its opposite end with a pivot 25 which projects laterally from both sides of the lever and is adapted to support a counterpoise 26 of sufficient weight to offset a load equal to that counterbalanced by the pendulum at full capacity. For the purpose of placing the counterpoise upon the lever 23 and removing it therefrom I have provided a bell-crank lever pivoted upon the bracket 24 and having one arm 27 partially located outside the housing and provided with a handle 28 and a pointer to indicate whether or not the counterpoise 26 has been placed on the lever 23. The other arm 29 of the bell-crank lever consists of a pair of parallel members which lie at the sides of the lever 23 and are connected by means of a screw 30. The counterpoise 26 comprises a pair of side plates 31 connected at their lower ends and slotted to receive the pivot 25. Projecting laterally from each plate 31 is a stud 32 adapted to be engaged by a notch 33 in the upper side of one of the members of the lever 29. Thus, if the arm 27 be moved in a clockwise direction by means of the handle 28, the arm 29 will be swung upwardly and the notches 33 will engage the studs 32 and lift the counterpoise 26 from the lever 23 a sufficient distance so that the counterpoise will not interfere with the lever 23 as it is pulled upwardly by the lever 21 when the pendulum swings to offset a load.

The free end of the arm 29 is pivotally connected to a link 34 (here shown as curved to avoid contacting the casing) which in turn is pivoted to the lower end of a rod 35 that extends upwardly into the casing 3 and is connected to the bight portion of a yoke 36, one arm of which forms a rack 37, while the other forms a guard 38. The rack 37 is in mesh with a gear wheel 39 which is mounted to rotate about an axis coincident with that of the indicating cylinder 15. Fixed to the gear wheel 39 is a frame 40 consisting of substantially X-shaped end members spaced from each end of the cylinder 15 and connected at the front and rear sides of the chart 15 by members 41 and 42 which are formed of or carry transparent material, such as glass or celluloid, of contrasting colors, for examples, green and red. When the parts are in the position shown in Figures 1 and 2, the green screens in the members 42 are between the indicating windows and the chart. In this position the green component of the light reflected from the unprinted portion of the chart surface and the green light from the green characters pass through the screen, substantially all other light reflected from the surface of the chart being absorbed. Since there is no observable difference in color between the unprinted portion of the chart and the characters printed in green as viewed through the green screen, the green characters are indistinguishable. Since only red light is reflected from the characters printed in red, none of the light from these characters passes through the green screen. These characters, therefore, appear when viewed through the green screen to be black on a green field, as indicated at A in Figure 7.

When the handle 28 is moved to lift the counterpoise 26 from the lever 23, the rack 37 is moved upwardly, thus partially rotating the gear wheel 39 and swinging the frame 40 to bring the red screens 41 between the windows and the chart. Since the red screen transmits the red component of the light from the unprinted portion of the chart surface, as well as the red light from the characters printed in red, the unprinted portion of the surface and the red characters will appear the same color when viewed through the red screen. The red characters will therefore be indistinguishable. The characters printed in green will, however, appear to be black on a red field, as indicated at A in Figure 8.

The weights indicated by the characters printed in green range, in the scale illustrated, from 0 to 15 lbs., and the weights indicated by the characters printed in red range from 15 to 30 lbs. If a comparatively light commodity is to be weighed, the handle 28 is turned so that the pointer points to zero, as shown in dotted lines in Figure 3. The weight and price computations then appear in black on a red field. Should the weight of the commodity exceed the automatic capacity of the scale, the handle is moved to the position shown in full lines in Figure 3, thus placing the counterpoise 26 on the lever 23 to offset 15 lbs. of the load and swing the green screen into position before the indicating wire. The total weight and the value of the commodity then appears in black on a green field. The red characters are superimposed upon the screen, or vice versa, when the chart is printed, each red value being 15 lbs. greater than the green value occupying the same position on the chart. Since the graduations should appear black through either screen, they are printed in black. The graduation which indicates 1 lb. when viewed through the red screen becomes a 16 lb. graduation when viewed through the green screen, etc. The computed money values are arranged in the same way, the value printed in green being greater by the value of 15 lbs. of the commodity than that in red adjacent the same black graduation. In using the scale the total weights and values are read directly so that there is no mental calculation involved. The graduations are as widely spaced as upon a drum of the same size having a capacity of only 15 lbs., while the total capacity is 30 lbs. The unprinted portion of the chart may be of any color that reflects both red and green lights. If the unprinted portion of the chart be white, however, the volume of colored light reflected from this portion is likely to be enough greater than the colored light reflected from the characters to render the characters slightly distinguishable, even when viewed through a screen of the same color. I prefer, therefore, to lightly tint the field between the characters in order to reduce the difference between the quantity of light reflected from the unprinted portion of the chart and that reflected from the characters which are to be made invisible.

In order to releasably hold the counterweight-lifting mechanism in either position, I have provided a spring locking plate 45 which is slidably mounted in the housing 2. The plate 45 is provided with a guide slot which receives a guiding screw 46 and with transverse slots 47 and 48. A portion of the arm 27 passes loosely through the slot 47, while a lug in alignment with the handle 28 projects through the housing and engages the upper edge of the slot 48 which is formed with a hump 49 to divide the upper edge of the slot into two pockets. When the lug is in either end of the slot, the plate is drawn downwardly by a spring 50 and the lug is thereby seated in one of the pockets and the counterweight-shifting mechanism held against accidental shifting. When, however, the handle is manually moved, the plate slides upwardly against the tension of the spring 50 and the hump rides over the lug, after which the plate is again drawn downwardly so that the lug is engaged by the pocket in the other end of the slot.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:—

1. In a weighing scale, in combination, weighing mechanism, a chart co-operating therewith and having a plurality of sets of characters, the sets being respectively visible by different kinds of light, the adjacent characters of the respective sets increasing in value at unequal rates from coincident zeros, and means for selectively bringing the characters of either set into prominence.

2. In a weighing scale, in combination, weighing mechanism, a chart co-operating therewith and having a plurality of optically different sets of characters, and a plurality of screens selectively movable into position between the operator and the chart and each adapted to bring into optical prominence a different set of characters.

3. In a weighing scale, in combination, weighing mechanism, a chart co-operating therewith and having graduations and a plurality of sets of characters, the sets being respectively visible by different kinds of light, said characters when visible giving to said graduations unlike values, and means for selectively rendering said graduations and the characters of either of said sets readable.

4. In a weighing scale, in combination, weighing mechanism, a chart co-operating therewith and having black graduations and two different colored sets of characters giving to said graduations unlike values, and transparent, colored screens for selectively hiding one set of characters.

5. In a weighing scale, in combination, weighing mechanism, a chart co-operating therewith and having a plurality of sets of characters, the sets being respectively visible by different kinds of light, and means for selectively viewing the characters of either set from the same side of the scale.

6. In a weighing scale, in combination, weighing mechanism, a chart co-operating therewith and having a plurality of sets of characters in different colors, the different sets in corresponding position having unlike values, and screens through which the respectively different sets may be selectively viewed from the same side of the scale.

7. In a weighing scale, in combination, weighing mechanism, a chart co-operating therewith and having a plurality of sets of characters respectively visible under different optical conditions, means for changing the capacity of said weighing mechanism, means for selectively legibilizing said sets of characters, and means operatively connecting said capacity-changing means and said legibilizing means.

8. In a weighing scale, in combination, weighing mechanism, a chart co-operating therewith and having two sets of characters respectively visible under different optical conditions, means for placing a counterpoise upon said weighing mechanism, and means connected with the first said means for selectively rendering the respective sets of characters legible.

9. In a weighing scale, in combination, weighing mechanism including a pendulum, a capacity-changing lever connected to said pendulum, manipulative means for placing a counterpoise on said capacity-changing lever, a chart having optically different sets of characters, screen means for selectively rendering said sets of characters legible, and means operatively connecting said manipulative means and said screen means.

10. In a weighing scale, in combination, weighing mechanism, a rotatable cylindrical chart connected thereto and bearing a plurality of optically different sets of characters, the corresponding characters of the respective sets having unlike values, and means for selectively rendering the characters of the respective sets legible from the same side of the scale.

11. In a weighing scale, in combination, weighing mechanism, a rotatable cylindrical chart connected thereto and having a plurality of different colored sets of characters thereon, and a plurality of colored selecting screens movable into position before said chart.

12. In a weighing scale, in combination, weighing mechanism, a cylindrical chart connected thereto and having two sets of differently colored characters, a casing about said chart having a reading window therein, a frame pivoted to said casing and carrying colored reading screens, and means for swinging said frame to selectively bring said screens in alignment with said reading window.

13. In a weighing scale, in combination, weighing mechanism, means for changing the capacity of said weighing mechanism, a cylindrical chart connected to said weighing mechanism and having two sets of differently colored characters, a casing about said chart having a reading window therein, a frame pivoted to said casing and carrying colored reading screens, means for swinging said frame to selectively bring said screens in alignment with said reading window, and means operatively connecting said frame-swinging means and said capacity-changing means.

14. In a weighing scale, in combination, a scale beam, an indicator variably positioned thereby, said indicator having a plurality of sets of indicating characters, one set being in one color and the other in another color, a capacity weight device adapted to deposit a weight upon the scale beam, and a color filter device interacting therewith and adapted to change the visibility of the graduations from one set to the other upon the changing of the capacity weight.

15. The invention set forth in claim 14 in which the color filter device is adapted to render one set of the colored characters invisible and the other set visible in a different color than that in which the set is printed.

16. In a weighing scale, in which means is provided for changing the load offsetting capacity of the scale by the application of capacity weight to a moving part thereof, in combination, an indicator adapted to indicate the offset load, said indicator having a plurality of sets of weight indications, each set having a particular color, and means including devices operated concurrently with the changes in the capacity weight for changing the visibility of the sets of indications by varying the color characteristics of light rays.

17. In a weighing scale in which means is provided for changing the load offsetting capacity of the scale by the application of capacity weight to a moving part thereof, in combination, an indicator for the offset load, said indicator having a plurality of sets of indicators, one set being in one color and the other being in another color, a color filter device having colors similar to the colors of the indications, and means operating concurrently with the shifting of the capacity weight device for shifting the color filter device in front of said indicator and thereby rendering one set of graduations visible and the other set invisible.

18. In a weighing scale, in combination, a scale beam, an automatic counterbalance therefor, a capacity weight device, and an indicator, said indicator having dual sets of weight indications in different colors, and means operated by said capacity weight device for changing the display of the indication by means of changeable color screens disposed in front thereof.

19. A weighing scale comprising in combination, a chart, means comprising a load support and load offsetting means therefor for displacing said chart in accordance with the applied load, said chart having a series of weight-indicating numerals and a second series of weight-indicating numerals substantially coextensive with said first series in the direction of displacement of the chart, and means for rendering one series of numerals visible and the other series invisible for a predetermined range of applied loads and for rendering the last mentioned series visible and the first mentioned series invisible for a higher range of applied loads.

CLARENCE H. HAPGOOD.